(12) United States Patent
Toledo Antonio et al.

(10) Patent No.: US 7,416,655 B2
(45) Date of Patent: Aug. 26, 2008

(54) SELECTIVE ADSORBENT MATERIAL AND ITS USE

(75) Inventors: José Antonio Toledo Antonio, Mexico City (MX); María Antonia Cortés Jacome, Mexico City (MX); Gerardo Ferrat Torres, Mexico City (MX); Carlos Angeles Chávez, Mexico City (MX); Luis Francisco Flores Ortiz, Mexico City (MX); Maria de Lourdes Araceli Mosqueira Mondragon, Mexico City (MX); Esteban López Salinas, Mexico City (MX); Jose Escobar Aguilar, Mexico City (MX); Rodolfo Juventino Mora Vallejo, Mexico City (MX); Fernando Alvarez Ramírez, Mexico City (MX); Yosadara Ruiz Morales, Mexico City (MX); Marcelo Lozada y Cassou, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 437 days.

(21) Appl. No.: 11/121,179

(22) Filed: May 4, 2005

(65) Prior Publication Data

US 2005/0263441 A1    Dec. 1, 2005

Related U.S. Application Data

(63) Continuation-in-part of application No. PCT/MX2004/000075, filed on Oct. 14, 2004, and a continuation-in-part of application No. PCT/MX03/000081, filed on Oct. 10, 2003.

(60) Provisional application No. 60/646,973, filed on Jan. 27, 2005.

(30) Foreign Application Priority Data

Aug. 19, 2004  (MX) .................. PA/A/2004/008055

(51) Int. Cl.
*C10G 29/00* (2006.01)
*C10G 17/00* (2006.01)
*C10G 29/04* (2006.01)
*C10G 25/00* (2006.01)
*C01G 23/047* (2006.01)

(52) U.S. Cl. ............. 208/249; 208/243; 208/244; 208/245; 208/246; 208/247; 208/248; 208/208 R; 208/254 R; 208/299; 208/295; 208/296; 208/297; 423/608; 423/609; 423/610; 977/734

(58) Field of Classification Search ........... 208/208 R, 208/243, 244, 245, 246, 247, 248, 249, 254 R, 208/299, 295, 296, 297; 423/610, 608, 609; 977/734

See application file for complete search history.

(56) References Cited

U.S. PATENT DOCUMENTS

| | | | |
|---|---|---|---|
| 2,833,620 A | 5/1958 | Gier et al. | |
| 2,853,257 A | 9/1958 | Cook | |
| 4,188,501 A * | 2/1980 | Rycheck et al. ............ | 585/643 |
| 4,689,211 A | 8/1987 | Nishiuchi et al. | |
| 4,705,762 A | 11/1987 | Ota et al. | |
| 5,089,462 A | 2/1992 | Wilson et al. | |
| 5,098,684 A | 3/1992 | Kresge et al. | |
| 5,102,643 A | 4/1992 | Kresge et al. | |
| 5,135,639 A * | 8/1992 | Schmidt et al. ............... | 208/66 |
| 5,730,860 A | 3/1998 | Irvine | |
| 6,027,775 A * | 2/2000 | Kasuga et al. ............. | 428/34.1 |
| 6,099,798 A | 8/2000 | Kambe et al. | |
| 6,248,230 B1 | 6/2001 | Min et al. | |
| 6,387,531 B1 * | 5/2002 | Bi et al. ...................... | 428/570 |
| 6,537,517 B1 * | 3/2003 | Kasuga et al. ............... | 423/610 |
| 6,551,501 B1 | 4/2003 | Whitehurst et al. | |
| 6,585,945 B2 * | 7/2003 | Wu et al. .................. | 423/239.1 |
| 6,797,127 B1 * | 9/2004 | Murata et al. ............ | 204/158.2 |
| 6,858,173 B2 * | 2/2005 | Zhan et al. ................... | 264/430 |
| 2001/0036897 A1 * | 11/2001 | Tsujimichi et al. ............ | 502/1 |
| 2002/0018853 A1 * | 2/2002 | Khare ........................ | 427/387 |
| 2002/0043483 A1 | 4/2002 | Leung et al. | |
| 2002/0043484 A1 | 4/2002 | Khare | |
| 2002/0161256 A1 * | 10/2002 | Bogan et al. ................ | 558/320 |
| 2003/0163013 A1 | 8/2003 | Yang et al. | |
| 2003/0181329 A1 * | 9/2003 | Tanaka et al. ............... | 502/338 |
| 2004/0265587 A1 | 12/2004 | Koyanagi et al. | |

FOREIGN PATENT DOCUMENTS

EP    0 469 675    2/1991

(Continued)

OTHER PUBLICATIONS

Estermann et al., "A Synthetic Gallophosphate Molecular Sieve with a 20-tetrahedral-atom Pore Opening", Nature, vol. 352, Jul. 25, 1991, 320-323.

(Continued)

*Primary Examiner*—Walter D. Griffin
*Assistant Examiner*—Huy-Tram Nguyen
(74) *Attorney, Agent, or Firm*—Roylance, Abrams, Berdo & Goodman, L.L.P.

(57) ABSTRACT

An adsorbent composition comprising a nanostructured titanium oxide material of the formula $TiO_{2-x}$, where $0 \leq x \leq 1$ with nanotubular and/or nanofibrilar morphology, high oxygen deficiency, having an orthorhombic JT crystalline phase described by at least one of the space groups 59 Pmmn, 63 Amma, 71Immm or 63 Bmmb, and comprising between 0 and 20 weight percent of a transition metal oxide is used for the selective adsorption of nitrogen compounds and/or sulfur compounds from light and intermediate petroleum fractions.

28 Claims, 3 Drawing Sheets

FOREIGN PATENT DOCUMENTS

EP  0 448 117  9/1991
KR  2003-0026268  3/2003

OTHER PUBLICATIONS

Freeman et al., "Bioreversible Protection for the Phospho Group: Chemical Stability and Bioactivation of Di(4-acetoxybenzyl) Methylphosphonate with Carboxyesterase", J. Chem. Soc., Chem Commun., 1991, 875-877.

Beck et al., "A New Family of Mesoporous Molecular Sieves Prepared with Liquid Crystal Templates", J. Am. Chem. Soc., 1992, vol. 114, No. 27, 10834-10843.

Kroto et al., "$C_{60}$: Buckminsterfullerene", Nature, vol. 318, Nov. 14, 1985, 162-163.

Iijima, "Helical Microtubules of Graphitic Carbon", Nature, vol. 354, Nov. 7, 1991, 56-58.

Tenne et al., "Polyhedral and Cylindrical Structures of Tungsten Disulpyhide", Nature, vol. 360, Dec. 3, 1992, 444-446.

Rao et al., "Inorganic Nanotubes", Dalton Trans., 2003, 1-24.

Lozada et al., "The Force Between Two Planar Electrical Double Layers", J. Chem. Phys., vol. 80, No. 7, Apr. 1, 1984, 3344-3349.

Lozada et al., "Three Point Extension for Hypernetted Chain and Other Integral Equation Theories: Numerical Results", J. Chem. Phys., vol. 92, No. 2, Jan. 15, 1990, 1194-1210.

Yeomans et al., "The Structure of Electrolytes in Cylindrical Pores", J. Chem. Phys. vol. 98, No. 2, Jan. 15, 1993, 1436-1450.

Degrevel, "Monte Carlo and HNC/MSA Results for an Asymmetrical Electrolyte in an External Electrical Field of Spherical Geometry", Molecular Physics, vol. 86, No. 4, 1995, 759-768.

Lozada et al., "Violation of the Electroneutrality Condition in Confined Charged Fluids", Physical Review E, vol. 53, No. 1, Jan 1996, 522-530.

Lozada et al., "Correlation of Charged Fluids Separated by a Wall", Physical Review Letters, vol. 77, No. 19, Nov. 4, 1996, 4019-4022.

Lozada et al., "Correlation of Charged Fluids Separated by a Wall of Finite Thickness: Dependence on the Charge of the Fluid and the Wall", Physical Review E, vol. 56, No. 3, Sep. 1997, 2958-2965.

Yu et al., "Charge Separation in Confined Charged Fluids", Physical Review Letters, vol. 79, No. 19, Nov. 10, 1997, 3656-3659.

Ma et al., "Nanotubes of Lepidocrocite Titanates", Chemical Physics Letters., vol. 380, 2003, 577-582.

Tsai et al., "Regulation of the Physical Characteristics of Titania Nanotube Aggregates Synthesized from Hydrothermal Treatment", Chem. Mater., vol. 16, No. 22, 2004, 4352-4358.

* cited by examiner

SELECTIVE ADSORBENT MATERIAL AND ITS USE

CROSS-REFERENCE TO RELATED APPLICATIONS

This application is a continuation-in-part of International Application No. PCT/MX2004/000075, with an international filing date of Oct. 14, 2004, and International Application No. PCT/MX2003/000081, with an international filing date of Oct. 10, 2003. This application also claims the benefit under 35 U.S.C. § 119(a) of Mexican Patent Application No. PA/a/2004/008055, filed Aug. 19, 2004, and under 35 U.S.C. § 119(e) of provisional application Ser. No. 60/646,973, filed Jan. 27, 2005. The disclosures of all of the foregoing applications are incorporated herein by reference in their entirety.

Reference is made to co-pending application Ser. No. 11/121,178, filed May 4, 2005, of Jose Antonio Toledo Antonio et al., entitled "Nanostructured Titanium Oxide Material And Its Synthesis Procedure".

FIELD OF THE INVENTION

The present invention is related with a material for the selective adsorption of nitrogen and/or sulfur compounds, or both, contained in different petroleum hydrocarbon fractions. The solid material used as adsorbent comprises a nanostructured material that presents a nanofiber morphology and/or nanotubes of a transition metal oxide with a metal of the IVA group with high specific area between 100 and 600 $m^2/g$, which can be promoted with a transition metal oxide. The materials of the present invention, are also used as adsorbents of other contaminants and diverse materials.

BACKGROUND OF THE INVENTION

Nowadays the governmental environment protection agencies demand combustibles with a low level of contaminants, such as sulfur, nitrogen, and metals like nickel, vanadium, among others. On the other hand, it has become necessary to process heavier loads to get the most out of the petroleum however the content of contaminants is increased in the processed oil. Thus, it is necessary the development of new processes and catalytic materials that remove the contaminants from the petroleum hydrocarbon fractions, and thus to reduce the contaminant gas emissions to the atmosphere and in this way to comply with the environmental regulations which are becoming increasingly more strict.

The most efficient processes for the removal of contaminants from the petroleum hydrocarbon fractions are the hydrotreatment processes, which are applied to almost all the petroleum fractions, such as gasolines, diesel, feedstocks for fluid catalytic cracking (FCC) and intermediate distillates.

In the process of hydroprocessing, the light and the intermediate petroleum fractions are hydrotreated and/or hydrocracked in the presence of hydrogen. The hydroprocessing processes encompass all the processes in which a petroleum fraction reacts with hydrogen at high temperature and pressure and they include reactions like hydrogenation, hydrodesulphurization, hydrodenitrogenation, hydrometallation, hydrodearomatization, hydroisomerization, hydrocracking, etc.

Such processes use mainly catalytic formulations specific for the removal of sulfur and nitrogen compounds. The molybdenum-alumina catalysts promoted with cobalt are generally used when the limiting specification concerns only the desulphurization, while the molybdenum-alumina catalysts promoted with nickel are largely used when in addition to the desulphurization it is necessary to hydrodenitrogenate and to partially saturate the aromatics content (hydrodearomatization) in the fraction that requires to be hydroprocessed, this is due to the high hydrogenating catalytic activity of nickel. The procedures for the preparation of hydroprocessing catalysts have been presented in U.S. Pat. Nos. 5,089,462 and 2,853,257, and in the European patents EP 0,448,117 and 0,469,675.

However, spite of all the efforts made to improve the performance of the hydroprocessing catalysts they produce fractions, for example of diesel and/or straight run gas oil (SRGO), which still have around 500 to 600 ppm of sulfur and nitrogen compounds. Because of this, considerable efforts are being made to find more efficient catalysts capable of reducing the content of these contaminants below 10 ppm in the motorcar combustibles to comply with the environmental regulations, which will take effect globally starting on 2006. The applicants of the present invention have discovered that the solution to this problem is to use a nanostructured material together with a procedure for the selective and efficient adsorption of the polar compounds, such as nitrogen and sulfur, from the petroleum hydrocarbon fractions, and thus obtain levels below 50 ppm of the mentioned contaminants.

The performance of the catalysts in the catalytic processes of hydrotreatment and fluid catalytic cracking (FCC) is affected or inhibited by the content of nitrogen compounds in the feedstocks. The removal of the polar nitrogen compounds, by selective adsorption processes (U.S. Pat. Nos. 6,248,230B1 and 6,551,501B1), from the feedstocks (naphtha and diesels) allows a better performance of the catalysts, an as a consequence, for example, the catalytic desulphurization process yields levels between 5 and 50 ppm of sulfur in the combustibles which makes them more active and efficient. The removal of the polar nitrogen compounds allows a good performance, less deactivation, of the catalysts in the hydrotreatment and fluid catalytic cracking (FCC) processes (Engelhard's FCC Knowledge Data Base, html).

Another strategy to produce ultra clean combustibles with ultra low content of nitrogen and sulfur, is to apply selective polar compounds adsorption processes directly to the gasolines, diesel, kerosenes, and other fuels used in the cars, trucks, planes, jets, etc at the end of the producing process or in the gasoline pool (U.S. Published application No. 2002/0043483).

The adsorbent materials for the adsorption of polar compounds of nitrogen and sulfur used in selective adsorption processes are liquid or solid and they are the same adsorbent materials used in the chromatography. However, the adsorbent capability of these materials is limited and a large quantity of them is required to get low levels of contaminants. This involves a large equipment installation, large space and high investment costs. Because of this it is necessary the development of new adsorbents to low the level of contaminants in both the feedstocks for hydrotreatment and FCC processes, and in the liquid combustibles at the exit of these processes. The following patents describe the state of the techniques which are closely related to materials used as adsorbents and their application process.

To be able to yield low levels of nitrogen and sulfur compounds in liquid combustibles, U.S. Pat. No. 6,248,230 B1 proposes a previous stage of removal of nitrogen compounds, by a selective adsorption process, from the feed loads for hydrotreatment process. As adsorbent material it is proposed a silica-gel, an alumina, and an ion exchange resin. The maximum level of adsorption obtained is of around 70% using a light fraction of straight run gas oil (SRGO) with 226 ppm in total nitrogen. The removal of the nitrogen compounds increases the efficiency of the catalytic processes of hydrodesulphurization, which lowers the sulfur levels to 50 ppm without increasing the severity of the reaction conditions.

U.S. Pat. No. 5,730,860 discloses a process for the desulfurization of liquid combustibles and feedstocks of hydrocarbons which contain unacceptable levels of nitrogen, sulfur, and oxygen contaminats, which are denominated as compounds with heteroatoms by the authors. The process consists in placing into contact very small particles of an adsorbent in a fluidized bed with the load to be treated. The adsorbent is saturated by the present polar compounds in the load, which contain nitrogen, sulfur, and oxygen. Then the fluidized bed is transported to a regeneration zone, where it is placed in contact with a flow of light hydrocarbons $C_1$-$C_4$ and $H_2$ at high temperature, to remove all the adsorbed polar compounds, and finally it is transported to an adsorption zone where the cycle is started again. This is a continuous adsorption process in a mobile bed.

U.S. Pat. No. 6,551,501 B1 describes a combined process to increase the efficiency of the hydrotreatment process and thus to comply with the environmental regulations of ultra-low sulfur content with the existing catalysts. The process consists in the selective adsorption of the polar nitrogen compounds from the load to be hydrotreated using solids and liquids as adsorbents. Among the liquids proposed as adsorbents it is found: dimethyl formamide, methanol, n-propanol, and iso-propanol in different concentrations with water and also with sodium hydroxide. Among the proposed solids as adsobers it is found: alumina, silica, silica-alumina, magnesium carbonate, magnesium hydroxide, calcium hydroxide, zinc hydroxide, zirconium hydroxide, AMB-A27, etc. The achieved efficiency in the removal of nitrogen compounds is between 10 and 70% depending on the material used.

The U.S. Published application No. 2003/0163013 refers to selective adsorbent materials for the adsorption of sulfur compounds for the purification in general of any hydrocarbon fraction. The proposed adsorbents are a "Y" zeolite of high specific area exchanged with Cu, Ag, and Na with the oxidation state of $1^+$, which can adsorb thiophenic, benzothiophenic, and thiophenic dibenzo alkyl compounds with high yield.

The U.S. Published application No.2002/0043484 discloses selective adsorbent materials for the adsorption of sulfur compounds in combustibles (gasolines and diesel). The adsorbents are zinc titanates impregnated with metals such as cobalt, molybdenum, nickel, iron, manganese, copper, tungsten, silver, strontium, vanadium, or mixes of them, in a partially reduced state. The process is carried out at a temperature between 316 and 371° C. in a partially oxidant atmosphere. A high capability of removal of sulfur compounds is achieved, however the amount of hydrotreated hydrocarbon per weight unit of adsorbent is very low, which indicates that the adsorption capability to adsorb the polar compounds by these adsorbents is very low.

All the adsorbent materials that are mentioned, in the aforementioned patents, can adsorb nitrogen or sulfur compounds present in hydrocarbons.

SUMMARY OF THE INVENTION

A process for the removal of both nitrogen and sulfur compounds that are present in liquid hydrocarbon fractions by the use of only a nanostructured material as adsorbent has now been found. Additionally, a composition of a nanostructured material with tubular morphology and/or nanofiber morphology, which contains one or more transition metals of the Periodic Table, has been found which has the capability of selectively adsorbing the organic compounds that contain nitrogen and sulfur present in the combustibles derived from petroleum.

According to one embodiment of the present invention, a solid nanostructured material with tubular and/or nanofiber morphology comprising a hydrated metallic oxide of a metallic element of the IVA group of the Periodic Table with high specific area, with or without incorporating additional transition metal elements, is used as an adsorbent of polar compounds of nitrogen and/or sulfur present in different petroleum hydrocarbon fractions.

Another embodiment of the present invention involves a procedure for the preparation of nanostructures with nanotubular morphology and/or nanofiber morphology comprising a metal oxide, of group IVA with a second transition metal of the Periodic Table, by a procedure of impregnation, ionic exchange or precipitation.

Another embodiment of the present invention is a process for the use of the nanostructured material of the present invention, with nanotubular morphology and/or nanofiber morphology, with or without incorporated transition metals, for the selective adsorption of nitrogen compounds or for the simultaneous removal of contaminants, nitrogen and sulfur compounds, from the liquid combustibles such as gasolines, diesel, kerosene, straight run gas oil, and heavier fractions like loads for FCC.

BRIEF DESCRIPTION OF THE DRAWINGS

Reference is made to the figures that are attached to the present invention.

DETAILED DESCRIPTION OF THE INVENTION

Figure 1:
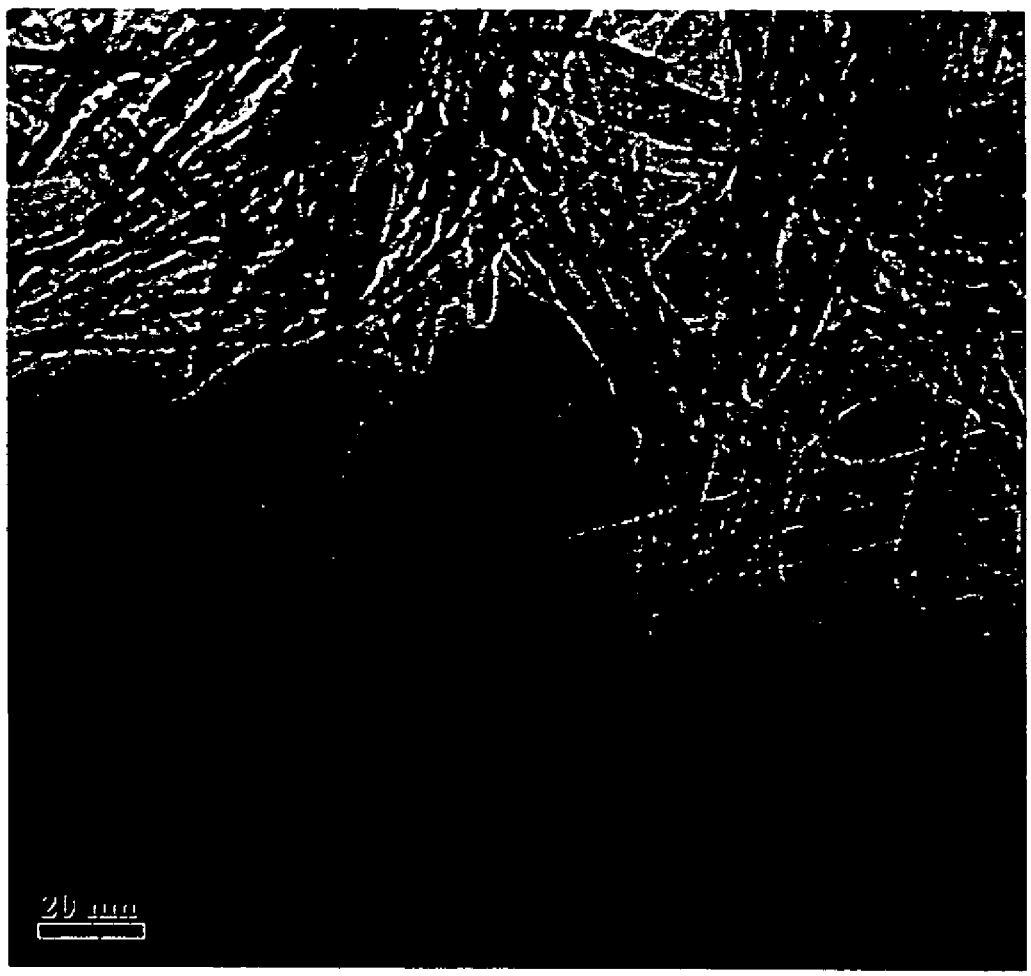
FIG. 1 shows the transmission electron microscopy (TEM) image of the adsorbent material, object of the present invention. This is a nanostructured material with a nanotubular and/or nanofibrilar morphology described in the Example 1, and used in the Examples 13, 14 and 15.

The adsorbent of the present invention comprises an inorganic oxide with a novel nanotubular or nanofiber morphology highly selective for the adsorption of polar compounds of nitrogen and sulfur that are contained in different petroleum hydrocarbon fractions such as gasolines, diesel, straight run gas oil, kerosene, FCC loads, etc. The nanostructured adsorbent material of the present invention is a titanium oxide material of the formula $TiO_{2-x}$, where $0 \leq x \leq 1$, having an orthorhombic crystalline structure which is thermically stable and with a nanofibrilar and/or nanotubular morphology, constituted by piled structural layers, which are folded or rolled inwards into themselves, or formed from overlapped semi-tubes presents a nanotubular or nanofiber morphology with a high specific area between 100 and 600 $m^2/g$, which may be promoted with a transition metal, preferably from group IB or IIB of the Periodic Table, for the selective and exclusive adsorption of nitrogen compounds or both nitrogen and sulfur compounds, which are contained in different petroleum hydrocarbon fractions.

For the specific case of the use of the nanostructured material of the present invention for the selective adsorption of nitrogen and/or sulfur compounds from petroleum hydrocarbon fractions, it is considered as light or intermediated fractions of petroleum those that comprise hydrocarbons whose boiling point is equal to or below to 180° C., and as intermediate petroleum hydrocarbons, those fractions whose boiling point is higher than 180.1° C. but lower than 400° C. The gasolines used in the examples hereinafter presented in this application comprise hydrocarbons whose boiling point is between 40 and 200° C. The diesel fraction used in the examples of the present invention comprises hydrocarbons whose boiling point is between 170 and 380° C. The referred straight run gas oil, used in the examples of the present invention, comprise hydrocarbons whose boiling point is between 214.8 and 276.5° C. The FCC load used in the examples of the present invention, comprise the heaviest hydrocarbons whose boiling point is between 268.6 and 575.5° C. The physicochemical characteristics of all the feedstocks used are described in Table 1.

The nanostructurated inorganic metal oxides used as adsorbents in the present invention comprise a nanostructured JT phase titanium oxide material of the formula $TiO_{2-x}$, where $0 \leq x \leq 1$, having an orthorhombic crystalline structure which is thermically stable and with a nanofibrilar and/or nanotubular morphology, constituted by piled structural layers, which are folded or rolled inwards into themselves, or formed from overlapped semitubes. The nanostructured titanium oxide material of the present invention has a unit cell with orthorhombic symmetry, which is described by each of the different spatial groups: 59 Pmmn, 63 Amma, 71 Immm and 63 Bmmb.

Such nanostructured inorganic metal oxides may be obtained following the methodology described in copending U.S. patent application Ser. No. 11/121,178 entitled "Nanostructured Titanium Oxide Material And Its Synthesis Procedure" filed of even date, the disclosure of which is hereby incorporated by reference in its entirety, and particularly as to the description of the JT phase composition and its method of production. The nanostructured titanium oxide may be used in a concentration between 80 to 100% by weight based on the total weight of the adsorbent, and it presents a superficial area between 50 and 500 $m^2/g$, a pore distribution between 2 to 10 nm, an orthorhombic structure whose unit cell is described by at least one of the spatial groups 59 Pmmn, 63 Amma, 71 Immm or 63 Bmmb, it presents a diffraction X-ray pick around 10 degrees in the 2θ scale in the (200) plane, presents a number of structural layers between 1 to 50 layers, and contains oxygen deficiency represented in the formula $TiO_{2-x}$ (where $x=0$ to 1.99).

It is considered that the nanomaterial of the present invention, represents a significant advancement in the field of adsorption processes, because it adsorbs nitrogen and sulfur compounds contained in gasolines, diesel, and straight run gas oil, with a very high efficiency. Also, the materials referred in the present invention will have a higher economical impact, because the process is carried out at a temperature close to room temperature and pressure close to room pressure, using a selective adsorption with a high capability of removal of the mentioned contaminants, without the need of using hydrogen.

A series of studies in confined fluids (M. Lozada-Cassou et al. J. Chem. Phys., vol. 80, 3344-3349 (1984); J. Chem. Phys., vol. 92, 1194-1210 (1990); J. Chem. Phys., vol. 98, 1436-1450 (1993); Mol. Phys., vol. 86, 759-768 (1995); Phys., Rev. E., vol. 53, 522-539 (1996); Phys Rev. Letts., vol. 77, 4019-4022 (1996); Phys. Rev. E., vol. 56, 2958-2965 (1997); Phys. Rev. Letts., vol. 79, 3656-3659 (1997)), showed that the confinement and curvature at nano-scale produces electric fields and molecular strengths of outstanding intensity. These studies show, for example, that in nano-confinement a separation of charge in the ionic fluid can occur (Phys. Rev. Letts., vol. 79 656-659 (1997)), which implies confinement pressures in the order of 1,250 atm and intermolecular repulsion forces of $5 \times 10^{-9}$ N. It is also clear that nanoporous and nanostructured materials, i.e., nanotubes present a high specific area. These results highlight the importance of the curvature and porosity for the molecular adsorption and this oriented the present invention towards the search of tubular structures at nanometric scale and to the development of new materials with enhanced absorbing properties.

The materials with tubular morphology present interesting properties when used in processes that involve the adsorption phenomena like the catalytic processes. They present high specific area because they have internal surface, external surface, surface in the vertices or in the inter-laminar regions. Also, in the curved regions, they present zones which are highly deficient of ions which make them to present relevant electric, electronic, and adsorption properties.

In general, the procedure to obtain the material used as adsorbent of the present invention, consist first in the treatment of a titanium oxide compound such as: titanium oxide with anatase crystalline structure, oxyhydroxide of amorphous titanium and/or amorphous titanium hydroxide, titanium oxide with a rutile type crystalline structure and/or directly from the mineral called rutile and/or ilmenite, a titanium salt with an alkaline solution 1 to 50 M, preferably between 5 and 20M in concentration composed by at least of an alkaline metal hydroxide, such as sodium hydroxide or sodium carbonate, or potassium or ammonium carbonate, preferably sodium hydroxide or potassium hydroxide.

One way in the procedure of the present invention consists in submitting the former suspension to a treatment under hydrothermal conditions in a stainless steel autoclave, with or without stirring at 20 rpm, at a temperature between 50 and 300° C., preferably between 80 and 250° C., and under autogenous pressure between 1 and 50 atm, for a period of time between 1 and 48 h, preferably between 1 and 24 h.

Another procedure of the present invention consists of submitting the first formed suspension to a thermal treatment under atmospheric pressure and in reflux conditions; with or without stirring at 100 rpm at a temperature in the range of 50 to 150° C., preferably in the range of 80 to 120° C. during a period of time in the range of 1 to 100 hours, preferably in the range of 1 to 80 hours.

Each of the materials originated from the two aforementioned syntheses, are submitted to a treatment of ionic exchange with a diluted acid solution with a concentration in the range of 0.1 and 1 M, using organic acids such as the following: chlorhidric acid, sulfuric acid, nitric acid, fluoric acid, boric acid and/or phosphoric acid, or ammonium chloride, ammonium carbonate, or any ammonium salt capable of exchanging sodium, preferably a solution of chloridric acid or nitric acid till the pH of the suspension lowers to a value between 1 and 7, preferably 2 and 4. Then, the suspension is aged for an interval of time between 1 to 24 hours, preferably 3 to 18 hours at room temperature, approximately 20° C. Once the aging process is finished, the suspension is separated by a filtration procedure, and the obtained solid is washed with deionized water and it is dried in a stove with a temperature in the range of 60 to 120° C., preferably between 80 and 110° C., during a time period of 4 to 24 h, preferably 12 to 18 h. Hydrogen titanates and/or mixed sodium and hydrogen titanates, objects of the present invention, are produced depending on the severity of the washing and/or on the lowering of the pH of the suspension.

The present invention also involves the inclusion of a promoting element in the nanostructured material with tubular and/or fibrilar morphology for the adsorption of polar groups. The promoting element for the adsorption of polar compounds can be any transition metal oxide of the Periodic Table. The inclusion of the promoting element can be carried out by impregnation, ionic exchange or precipitation, preferable by ionic exchange. The ionic exchange is carried out with a solution that contains the element to be impregnated and by the exposure of the nanostructured material to this solution, during a period of time between 1 and 24 hours, followed by a filtration procedure and a washing with abundant deionized water. Or the ionic exchange is carried out by placing in contact the nanostructured material with an aqueous solution and/or an alcoholic solution which contains a salt of the material to be impregnated followed by evaporation of the solvent. The material is dried in a stove at a temperature between 100 and 150° C. Or the ionic exchange is carried out through the precipitation of a solution that contains the material to be impregnated, with a basic solution like ammonium hydroxide, ammonium carbonate, urea, etc.

The activation of the adsorbent materials, with or without an impregnated transition metal, can be carried out in the adsorption column or in an independent oven. The activation process consist in a thermal treatment of the adsorbent material at a temperature between 200 and 800° C., at a heating speed between 2 and 10° C./min in the presence of a gas flow at a rate between 0.1 and 1 L/min, which can be oxidant, inert and/or reductive such as air, hydrogen, nitrogen, helium, argon, etc, preferably in an inert atmosphere of nitrogen, argon, helium, etc. Once the desired temperature is reached it is kept constant for a period of time between 1 and 10 h and then it is let to cool down at a temperature between 20 and 150° C.

The resulting material from the activation procedure presents a nanotube and/or nanofiber morphology with a specific area, determined by the BET (Brunauer Emmett and Teller) method, between 100 and 500 m$^2$/g, depending on the dimensions of the nanotubes and/or nanofibers and as a consequence also depending on the synthesis conditions used to synthesize them. The materials used as adsorbents present nanotubular morphology in their hydrated form. These are hydrogen titanates and/or mixed sodium and hydrogen titanates, which after a thermal treatment under inert, oxidant or reductive atmosphere are transform into a titanium oxide, $TiO_{2-x}$ (where x=0 to 1.99), with a high oxygen deficiency and a JT orthorhombic crystalline array. In Table 2, some of the textural characteristics of the materials used as adsorbents are presented.

The nanostructured material with nanotubular morphology, object of the present invention, after being activated by the thermal treatment in an inert atmosphere, presents a great number of anionic vacancies, which confer the property of being an absorbent of the polar compounds (nitrogen and/or sulfur) contained in liquid combustibles.

Once the adsorbent material, with or without the promoting element, has been activated it is placed in contact with a liquid hydrocarbon fraction such as gasolines, diesel, light naphtha, heavy naphtha, straight run gas oil, and/or heavier petroleum fractions like the feedstock for FCC.

The adsorption procedure of polar compounds contained in the liquid combustibles is carried out at a temperature of 0 to 150° C., during an adsorption time between 0.5 and 60 min, by passing a flow of light naphtha, heavy naphtha, straight run gas oil, and/or heavier petroleum fractions on a mobile or fixed bed of the material with nanotube and/or nanofiber morphology, promoted or not, but if promoted, it is preferably with a transition metal oxide of Groups IB, II B, VI, VII and VIIIA of the Periodic Table, preferably the oxides of Zn, Cu, Ni, Co, Fe, Ag, Mn, Cr, V, Mo or W, and most preferably Co or Zn. The amount of transition metal oxide promoter utilized may be from 0 or 1 up to 20 weight percent, preferably from 1 to 10 weight percent, based on the total weight of the adsorbent. Thus, the nanomaterial may comprise from 100 or 99 up to 80 weight percent of the total weight of the adsorbent. Addition of the transition metal oxide promoter to the JT nanomaterial may be by any suitable means including use of salt of the transition metals, such as, for example, a nitrate, chloride, acetate or the like, which is transformed into the corresponding transition metal oxide by heating during the process. Alternatively, the transition metal oxide may be added directly to the nanomaterial. Suitable transition metal oxides include, for example, CuO, AgO, NiO, $MoO_3$, CoO, and the like.

The adsorbent materials of the present invention have the capability of removing between 50 and 100% by weight of the nitrogen compounds and up to 80% by weight of the sulfur compounds contained in liquid combustibles in one adsorption stage. The capability to remove the contaminants depends on the starting content in the hydrocarbon fraction to be treated. By increasing the adsorption stages, i.e., by passing the liquid combustible several times through a new or fresh adsorbent it is allowed to obtain a combustible free of polar compounds as contaminants.

In general, the operational conditions used for the application of the adsorbent materials, objects of the present invention, are temperatures between 0 and 150° C., preferably between 0 or 5° and 120° C., depending on the weight of the hydrocarbon fractions, a pressure between 0.5 and 3.0 atm, and a ratio adsorbent/volume of the hydrocarbon fraction to be treated between 0.01 and 0.5, and an adsorption time between 0.5 and 60 min.

When the feedstock is a gasoline or diesel fraction, the operating conditions preferably include a pressure between 0.5 to 3 atm, a ratio adsorbent mass/volume of treated hydrocarbon between 0.0125 and 0.2, adsorption temperature between 10 and 40° C., adsorption time between 0.5 and 60 min, which result in a percentage of nitrogen removal of 30 to 95%, and percentage of sulfur removal of 5 to 72%.

When the feedstock is primary light straight run gas oil (SRGO), the operating conditions preferably a pressure between 0.5 to 3 atm, a ratio adsorbent mass/volume of treated hydrocarbon between 0.02 and 0.2, adsorption temperature between 5 and 60° C., adsorption time between 0.5 and 60 min, resulting in a percentage of nitrogen removal of 30 to 95%, and percentage of sulfur removal of 15 to 30%.

When the feed is a FCC light naphtha fraction, the operating conditions preferably include a pressure between 0.5 to 3 atm, a ratio adsorbent mass/volume of treated hydrocarbon between 0.02 and 0.06, adsorption temperature between 20 and 30° C., adsorption time between 0.5 and 60 min, which result in percentage of nitrogen removal of 85 to 95%, and percentage of sulfur removal of 25 to 40%.

When the feed is a FCC heavy naphtha fraction, the operating conditions, preferably include a pressure between 0.5 to 3 atm, a ratio adsorbent mass/volume of treated hydrocarbon between 0.02 and 0.06, adsorption temperature between 20 and 45° C., adsorption time between 0.5 and 60 min, resulting in a percentage of nitrogen removal of 85 to 95%, and percentage of sulfur removal of 15 to 20%.

When the feed is a FCC load, the operating conditions include a pressure between 0.5 to 3 atm, a ratio adsorbent mass/volume of treated hydrocarbon between 0.013 and 0.5, adsorption temperature between 20 and 100° C., adsorption time between 4 and 30 min, , resulting in a percentage of nitrogen removal of 35 to 85%.

The adsorbent materials, objects of the present invention, can be used in any process that involves the adsorption of polar compounds from the liquid fractions of petroleum. They can be used at the beginning of the processes with the objective of protecting the useful life of the catalysts and/or the adsorbents can be applied to the combustibles at the end of the processes with the objective of reducing to zero the nitrogen and sulfur contaminants contained in the combustibles. The reduction of the nitrogen compounds content in the straight run gas oils for hydrotreatment allows a deep hydrodesulphurization yielding of combustibles with sulfur content between 10 and 100 ppm, also this avoids the deactivation of the catalysts.

For the quantification of the polar compounds of nitrogen and sulfur in the resulting liquid products from the reaction, the liquid samples taken were analyzed in a total sulfur and nitrogen analyzer ANTEK 7000 B 3 equipped with a chemiluminescence detector.

The adsorbent material, object of the present invention, is characterized by the presence in the adsorbent composition of the following forms including particles, dusts, tablets, extrudates, spheres or micro spheres.

EXAMPLES

In the following text we present some examples related with the adsorbent materials and their adsorption capability to adsorb polar compounds of nitrogen and sulfur contained in different petroleum hydrocarbon fractions involved in the refinery of petroleum without limiting their applications.

In Table 1 it is presented the characterization of the different hydrocarbon fractions involved in the refinery of petroleum with different boiling temperatures and different content of polar compounds of nitrogen and sulfur, which were used to obtain the examples and the possible applications, objects of the present invention, without limiting their reach. The percentage of the removal of nitrogen or sulfur compounds was determined from the total initial content of the contaminant in question minus the content of the contaminant after the adsorption treatment divided by the total initial content of the contaminant, $\% R=(C_{No}-CN)/C_{No}$, where $C_{No}$ is the content of contaminant in the load and CN is the content of contaminant after the adsorption treatment, being the contaminant nitrogen or sulfur.

Examples 1 to 3

These examples illustrate the preparation of a nanostructured material of hydrogen titanate and/or mixed sodium and hydrogen titanate with a nanotubular or nanofiber morphology.

For the Example 1, 45 grams of titanium oxide with anatase structure, commercially available, whose textural characteristics correspond to the reference material of the Example 12 in Table 2, is placed in contact with 3 L of an aqueous solution where previously 1200 grams of an alkaline metal hydroxide has been dissolved, preferably sodium hydroxide. The formed suspension is submitted to a thermal treatment at a temperature of 100° C., under autogeneus pressure in an autoclave during a period of time between 24 and 48 hours.

For Example 2, 150 grams of titanium oxide with anatase structure, commercially available, whose textural characteristics correspond to the reference material of the Example 11 in Table 2, is placed in contact with 3 L of an aqueous solution where previously 1200 g of an alkaline metal hydroxide has been dissolved to form a 10 M solution of an alkaline metal hydroxide, preferably sodium hydroxide. Same as in the Example 1, the formed suspension is submitted to a thermal treatment at a temperature of 100° C., under autogeneus pressure in an autoclave during a period of time between 24 and 48 h.

In Example 3, the synthesis of the adsorbent material was carried out starting from 37.5 Kg of titanium oxide with anatase structure, commercially available, whose textural characteristics correspond to the reference material of Example 12 in Table 2. This material is placed in contact with 750 L of an aqueous solution where previously 300 Kg of an alkaline metal hydroxide has been dissolved to form a 10 M solution of an alkaline metal hydroxide, preferably sodium hydroxide. The formed suspension is submitted to a thermal treatment at a temperature of 100° C., under autogeneus pressure in an autoclave during a period of time between 24 and 48 hours.

The resulting material from Examples 1, 2, and 3 is filtered and placed in contact with a 1M solution of chlorhidric acid for ionic exchange of sodium by hydrogen, until the pH of the suspension lowers to a value between 1 and 7, preferably between 2 and 4. Then the suspension is stirred for a period of time ranging from 1 to 24 hours. Finally, each suspension is filtered washed with abundant deionized water and dried at 110° C. in an oven.

Figure 2:
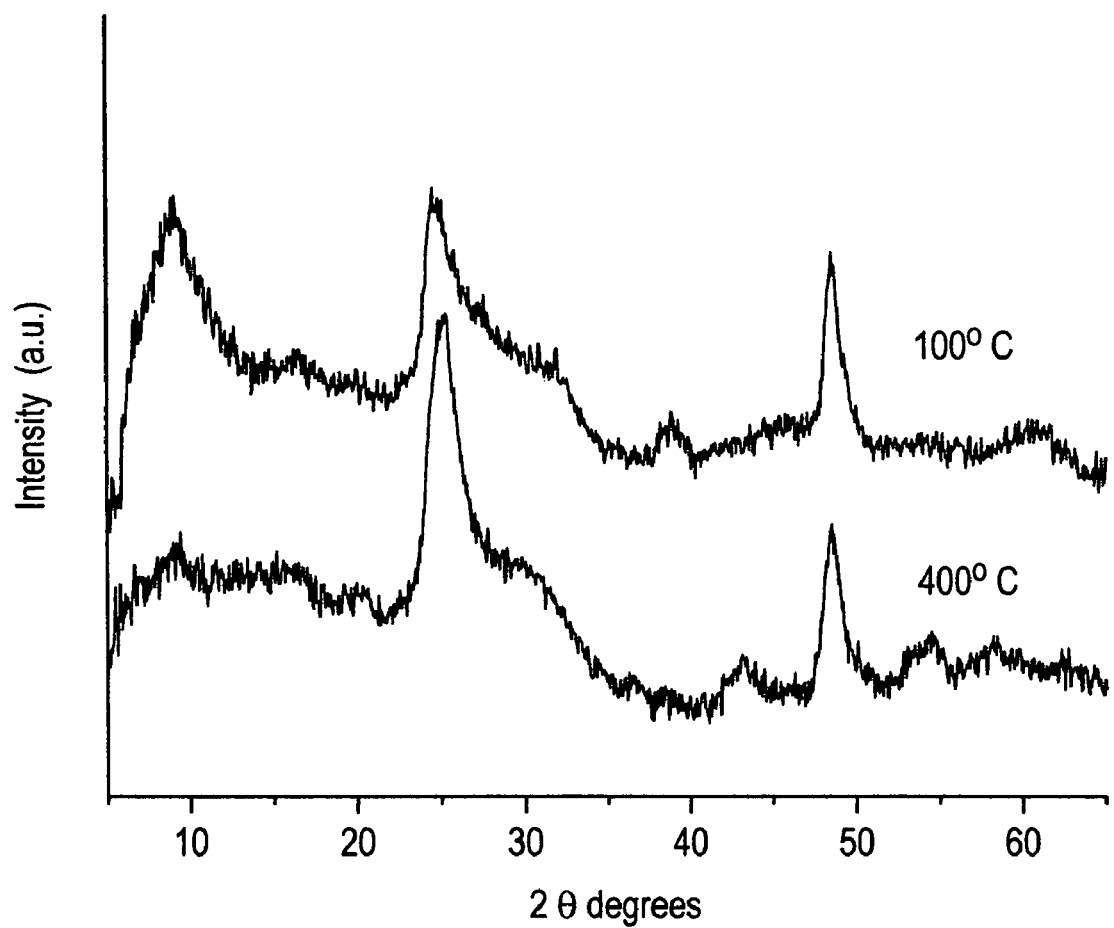
FIG. 2 shows the X-ray diffraction patterns characteristic of the Example 3, as an adsorbent dried at 100° C. and thermically treated at 400° C., with crystal sizes around 10 nm.
Figure 3:
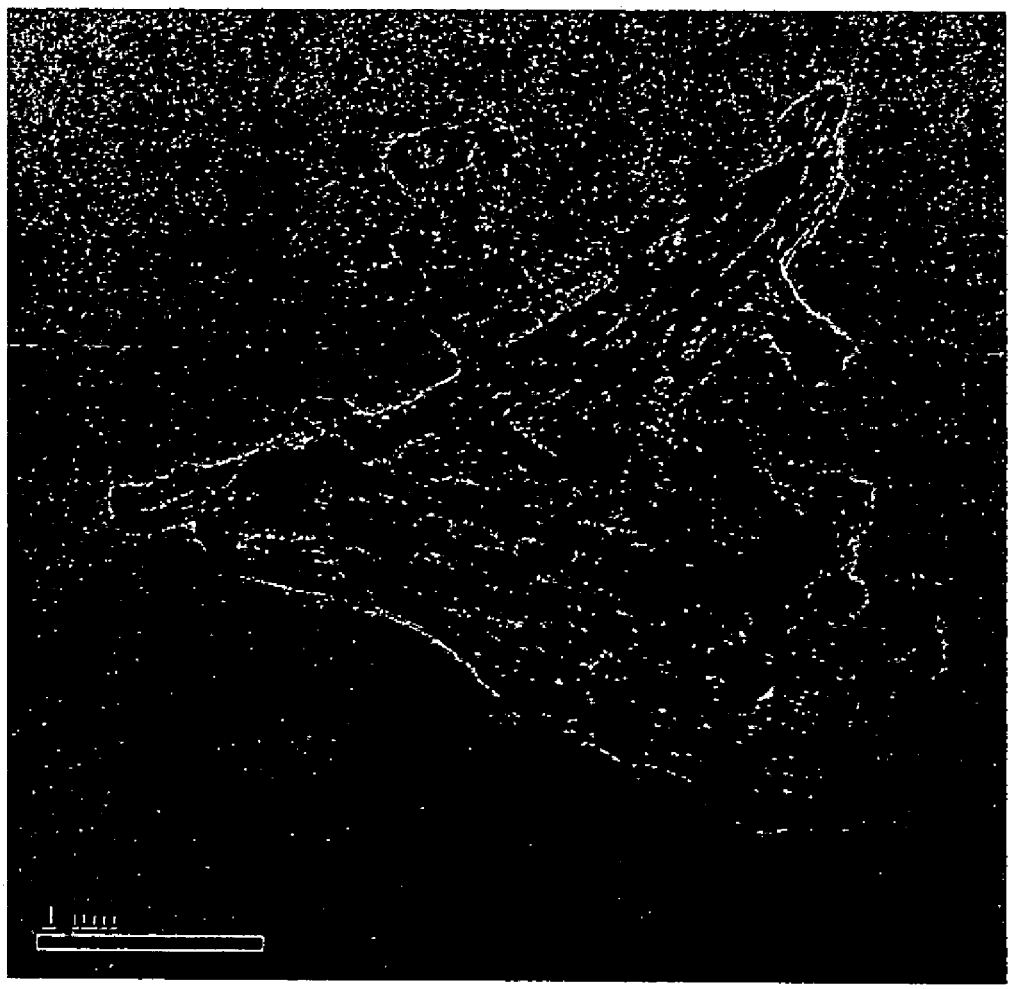
FIG. 3 shows the transmission electron microscopy (TEM) image of the adsorbent material of the present invention, after being placed in contact with liquid combustible. A halo around the nanotubes which are hydrocarbon compounds adsorbed in the surface can be seen.

The resulting material from each of the examples is basically constituted of nanofibers and/or nanotubes, as shown in FIG. 1. Its X-ray diffraction pattern is presented in FIG. 2. From FIG. 2 it can be concluded that the structure corresponds to a hydrogen titanate and/or to a mixed sodium and hydrogen titanate with an orthorhombic symmetry. This structure has been defined in copending U.S. patent application Serial No. 11/121,178 entitled "Nanostructured Titanium Oxide Material And Its Synthesis Procedure", filed of even date, which is hereby incorporated by reference.

The nanotubes are composed of 1 to 50 layers with a spacing of 0.6 to 1.7 nm between layers. The nanotubes present an internal diameters between 3 and 10 nm a specific area between 300 and 500 $m^2/g$ and an average pore diameter between 4 and 10 nm, see Example 1 in Table 2.

Examples 4 to 8

These examples present the incorporation of a transition metal on a nanostructured material through a procedure of ionic exchange.

In Example 4, 5 grams of the material with a nanotubular and/or nanofiber morphology, which was obtained in the Example 1, is placed in contact with a 50 ml of a 0.01 M solution of copper nitrate and the solution is heated at 60° C. for a period of time ranging from 1 to 5 hours, then the solution is cooled down at room temperature, filtered, and washed with abundant deionized water and dried at 110° C. in a stove.

In Example 5, 10 grams of the material with a nanotubular and/or nanofiber morphology, which was obtained in the Example 1, is placed in contact with a 100 ml of a 0.04 M aqueous solution of copper acetate and the solution is heated at 60° C. for a period of time ranging from 2 to 24 hours, preferably 18 hours. Then the solution is cooled down at room temperature, filtered, and washed with abundant deionized water and dried at 110° C. in a stove.

For Examples 6, 7, and 8, 10 grams of the material with a nanotubular and/or nanofiber morphology, which was obtained in the Example 2, is placed in contact with an aqueous solution 0.02 M of copper nitrate at a temperature of 20, 50, and 65° C., respectively, for a period of time ranging from 1 to 5 hours. Then the solution is cooled down at room temperature, filtered, and washed with abundant deionized water and dried at 110° C. in a stove.

The final concentration of copper in the obtained materials was determined with atomic absorption spectroscopy, and the results of the metal content are presented in Table 2. As it can be seen in Table 2 the content of the incorporated metal, through the ionic exchange procedure, increases as the molarity of the exchange solution increases. The morphologic, textural, and structural characteristics of the obtained materials are maintained with respect to those of the starting material. The obtained materials present X-ray diffraction patterns that are characteristic of the hydrogen titanate and/or of hydrated titanate, with a fiber and/or nanotubular morphology and specific areas between 300 and 550 $m^2/g$, see Table 2.

Examples 9 to 10

For Example 9, a zinc nitrate salt is used while for Example 10 a zinc acetate salt is used. In each of the examples 10 g of the nanostructured material, obtained in Example 2, is placed in contact with an aqueous solution 0.02 M of the salt at a temperature between 20 and 110° C. during a time ranging from 1 to 5 hour. Then the solution is cooled down at room temperature, filtered, washed with abundant deionized water, and dried at 110° C. in a stove.

The final concentration of zinc in these materials was determined using atomic absorption spectroscopy and was found to be 1.9 and 1.8% in weight for each example, respectively. In Table 2 it is observed that independently of the used salt the results are similar. The morphologic, textural, and structural characteristics of the obtained materials are maintained with respect to those of the starting material, Example 2. The obtained materials present X-ray diffraction patterns which are characteristic of the hydrogen titanate and/or of hydrated titanate, with a fiber and/or nanotubular morphology and specific areas between 300 and 550 $m^2/g$, see Table 2.

Examples 11 and 12

These examples are not related to the nanostructured material that is described in the present invention, however they are related to a titanium oxide with anatase structure and these examples are presented with the objective of comparing the adsorption capability of this structural phase with the one of the nanostructured materials which are objects of the present invention.

These examples correspond to the structural and textural characterization of the titanium oxide materials with anatase structure, which are commercially available. The described reference in Example 11 corresponds to nanoparticles of hydrated titanium oxide with a high specific area of 325 $m^2/g$ and anatase crystalline phase with crystal sizes lower than 5 nm. The described reference in Example 12 corresponds to a made-nanoparticle titanium oxide with anatase crystalline phase and crystal sizes between 10 and 25 nm, and a specific area of 100 $m^2/g$.

Examples 13 to 29

These examples are presented with the objective of evaluating the capability of adsorbent sulfur and nitrogen polar compounds of the synthesized materials in the former examples. The adsorbent materials are placed in contact with a fraction of hydrocarbons that contain such polar compounds at a room temperature and at a relation adsorbent mass/hydrocarbon volume between 0.0125 and 0.05.

In general the adsorption of sulfur and nitrogen polar compounds from different fractions of hydrocarbons is carried out as follows: 0.5 grams of adsorbent material as hydrogen titanate, and/or mixed sodium and hydrogen titanate, and/or transition metal titanate, prepared according the procedures described in Examples 1 to 10, are placed in a tubular glass reactor with an internal diameter of 8 mm. Then, the material is thermally activated at a temperature of 400° C. in a dynamic atmosphere of an inert gas like nitrogen, helium, argon, preferably nitrogen. Only for the case of Example 21 the material was activated at a temperature of 300° C. The heating speed from room temperature to the activation temperature was between 2 and 10° C./min, and the activation temperature was maintained for a period of time in the range of 1 and 10 hours, preferably 2 to 4 hours. Once the activation time has passed the reactor is let to cool down to room temperature, between 20 and 30° C.

After thermal activation the materials present a specific area between 300 and 350 $m^2/g$. A typical morphology of these materials is shown in FIG. 1 where a micrograph obtained using a high resolution electronic microscope is provided. A peculiar characteristic of the materials, after being thermally treated under an inert atmosphere, is that a change in color takes place from white to dark grey, which indicates a reduction of the titanium or the presence of a high oxygen deficiency in the resulting material.

The materials obtained from Examples 11 and 12 were activated using the same activation procedure already described. They presented collapse and agglomeration of the nanoparticles and there is a decay in the specific areas to values between 30 and 60 $m^2/g$, and an increase in the crystal size. In comparison with the nanostructured materials objects of the present invention, the titanium oxide with anatase phase do not present a change in color, it remains white, after being thermally treated.

Then, a flux of liquid hydrocarbons such as gasoline, diesel, straight run gas oil, light naphtha and/or heavy naphtha from the fluid catalytic cracking and/or heavier loads like the feedstocks for the fluid catalytic cracking process, with different boiling points and different content of nitrogen and sulfur polar compounds is passed. The physicochemical characteristics of the liquid hydrocarbon flux are presented in Table 1. The required flux, depending on the desired ratio mass/volume, is passed during 1 hour at a pressure between 0.5 and 3 atm and at an adsorption temperature between 10 and 45° C.

In Examples 13 to 16 the nanostructured adsorbent material of hydrogen titanate and/or mixed sodium and hydrogen titanate, obtained in the Example 1, is placed in contact with different hydrocarbon fractions, with different content of nitrogen and sulfur polar compounds, such as gasoline, diesel, light naphtha and/or heavy naphtha from the process of fluid catalytic cracking. It is found that the absorbent material removes in all the loads around 90% of the nitrogen compounds and that the removal of the sulfur compounds depends on the initial concentration in the hydrocarbon fraction.

As it can be seen in Table 3 the adsorbent material is capable of removing sulfur compounds as well as nitrogen compounds. Depending on the type of load it is possible to remove 70 to 80% of sulfur from gasoline and diesel with an initial concentration of sulfur lower than 600 ppm. While for the case of loads with an initial concentration of sulfur superior to 1000 ppm the removal is between 10 to 50%. This adsorption procedure of contaminants will allow to considerably reduce the content of nitrogen and sulfur contaminants from the combustibles to fulfill the environmental regulations and without lowering or deteriorating the quality of such combustibles, as it happens when they are submitted to hydrotreatment processes.

In Examples 17 to 20, it is illustrated the effect of the addition of Cu, a IIB group metal, to the nanostructures of hydrogen titanate and/or mixed sodium and hydrogen titanate through an ionic exchange procedure to form the metallic titanates obtained in Examples 4 and 5. In general it is observed that the addition of Cu to the nanostructured materials, objects of the present invention, slightly inhibits their adsorption capability of nitrogen compounds and strongly inhibits their adsorption capability of sulfur compounds, see reported data in Table 3. It can also be seen in Examples 17 to 20 that the increase in the ratio adsorbent/volume of treated petroleum hydrocarbon fraction increases the efficiency of the removal of nitrogen and sulfur compounds. For a ratio adsorbent/volume of 0.0125 there is a removal of 43% of the nitrogen compounds while for a ratio adsorbent/volume of 0.05 the removal is of 82% for the case of the adsorbents that contain copper. The removal of nitrogen and sulfur compounds was favored for the case of the adsorbent with the lowest content of copper.

In Examples 21 and 22, the adsorbent material, synthesized in Example 2, is thermically activated in an inert atmosphere at 400 and 300° C., respectively. It is observed an increase in the adsorption capability of the adsorbent material from 50 to 71% when the activation temperature is reduced according with the data reported in Table 3.

Examples 23 to 25, correspond to the exposure of the synthesized materials in Examples 6, 7 and 8, which correspond to adsorbent materials with different content of copper, incorporated on the adsorbent material synthesized in the Example 2. For these cases the addition of copper favored the adsorption property according to the data reported in Table 3 (compare with Examples 21 and 22 reported also in Table 3).

Examples 26 and 27 illustrate the effect of the addition of zinc to the nanostructured materials. The adsorption of nitrogen and sulfur compounds contained in a diesel was carried out on a material synthesized in Examples 9 and 10. In Table 3 it can be seen that the addition of zinc increases the initial adsorbent capability of the adsorbent material, synthesized in Example 2, from 53% to 84% and 86% for the Examples 26 and 27, respectively. Both materials have a similar content of zinc.

Examples 28 and 29 present the adsorption of nitrogen and sulfur compounds contained in diesel on titanium oxide nanoparticles with anatase structure described in Examples 11 and 12. In Table 3 it is observed that the titanium oxide nanoparticles with anatase structure remove 37 and 39% of nitrogen compounds and between 8 and 12% of sulfur compounds from a diesel. Apparently, the initial specific area of the material does not affect its adsorbent properties.

On the other hand, compared with the nanostructured materials (which remove 90% of nitrogen compounds) the nanoparticles present a lower adsorbent capability of nitrogen compounds (39%), and a lower capability to remove sulfur compounds (12%) while the nanostructured materials remove up to 69% of the sulfur compounds contained in a diesel. This is attributed to a great amount of oxygen vacancies generated on the surface of the titanium oxide obtained from the activation of the hydrogen titanate under inert, oxidative and/or reductive atmosphere.

Examples 30 to 37

Examples 30 to 37 show the adsorption of nitrogen and sulfur compounds contained in a gasoline with the characteristics described in Table 1 (load A) on a nanostructured material obtained in the Example 3.

In contrast with the former examples, the activation was carried out at 300° C., with a dynamic flux of an inert gas in an independent reactor then the adsorption tests were carried out in a container different to the former and with exposure of the material to the air. These tests were carried out by placing in contact the hydrocarbon fraction with the adsorbent nanostructured material in a ratio mass/volume of 0.2 at a temperature of 25° C. and taking samples at different contact times. In Table 4 it can be seen that the adsorption of nitrogen and sulfur compounds takes place at high rates, from 30 s until 10 min, between 90 to 95% of the nitrogen compounds were removed while 20 to 30% of the sulfur compounds were removed. Therefore it can be concluded that the adsorption of these compounds is practically immediate.

Examples 38 to 43

These examples illustrate the adsorption of nitrogen compounds contained in a gasoline with the characteristics described in Table 1, load A, at different ratio adsorbent/volume of treated gasoline, on a nanostrucured material prepared in the Example 3 at a room temperature of 22° C. and in a contact time of 5 min. It is observed in Table 5 that as the ratio mass/volume increases from 0.02 to 0.2 the removal of the nitrogen compounds contained in the gas increases from 61 to 93% and the removal of sulfur compounds increases from 15 to 30%.

Examples 44 to 46

These examples illustrate the adsorption of nitrogen and sulfur polar compounds contained in a gasoline with the characteristics described in Table 1, load A, at different temperatures, on a nanostructured material prepared in the Example 3. These examples are carried out at a ratio mass/volume of 0.05 and a contact time of 5 min. In Table 6 it is observed that the removal of the sulfur and nitrogen polar compounds is favored at a temperature lower than 5° C. When the adsorption temperature is increase from 5 to 40° C. the removal of the sulfur and nitrogen polar compounds is decreased from 79 to 79% and from 18 to 14%, respectively.

Examples 47 to 54

These examples illustrate the adsorption of nitrogen and sulfur polar compounds contained in a hydrocarbon fraction called diesel with the characteristics described in Table 1, load B, on a nanostrucured material, object of the present invention, prepared in the Example 3. As in the Examples 30 to 37 the activation was carried out at 300° C., with a dynamic flux of an inert gas in an independent reactor then the adsorption tests were carried out in an independent container and with exposure of the material to the air. These tests were carried out by placing in contact the diesel with the adsorbent nanostructured material in a ratio mass/volume of 0.05 at a temperature of 22° C. and taking samples at different contact times. In Table 7 it can be seen that the adsorption of nitrogen and sulfur compounds takes place at high rates from 30 s until 10 min approximately 75% of the nitrogen compounds were removed while 10 to 15% of the sulfur compounds were removed. For this hydrocarbon fraction the adsorbent presents mainly a high adsorption capability towards nitrogen compounds.

Examples 55 to 60

These examples illustrate the adsorption of nitrogen and sulfur polar compounds contained in a diesel with the characteristics described in Table 1, load B, at different ratios of adsorbent mass/diesel volume on a nanostructured material, prepared in the Example 3. These tests were carried out by placing in contact the diesel with the adsorbent nanostructured material at a temperature of 22° C. and at a contact time of 5 min. In Table 8 it can be seen that as the ratio mass/volume increases from 0.02 to 0.2 the removal of the nitrogen compounds contained in the diesel increases from 57 to 91% and the removal of sulfur compounds increases from 20 to 27%.

Examples 61 to 63

These examples illustrate the adsorption of nitrogen and sulfur polar compounds contained in a diesel with the characteristics described in Table 1, load A, at different temperatures. The adsorbent used is the material prepared in the Example 3. These examples are carried out at a ratio mass/volume of 0.05 and a contact time of 5 min. In Table 9 it is observed that the removal of the sulfur and nitrogen polar compounds is favored at room temperature, around 22° C., where there is a maximal removal of nitrogen compounds of 78% while at 10 and 50° C. the removal of the sulfur and nitrogen polar compounds is 68 and 69%, respectively. It seems that the capability of removing sulfur compounds keeps constant and between 22 and 23%.

Examples 64 to 73

These examples illustrate the speed of removal of nitrogen and sulfur compounds contained in a hydrocarbon fraction called primary light straight run gas oil (SRGO) with the characteristics described in Table 1, load C. The experiments were carried out as described in Examples 30 to 37, for the case of gasoline, and as in the Examples 47 to 54, for the case of diesel. The activation of the material was carried out with the described procedure for the case of gasoline and diesel. The ratio mass/volume used was 0.05, at a temperature of 25° C., and samples were taken at different contact times. In Table 10 it is observed that as the time passes it is possible to increase preferably the efficiency of the removal of the nitrogen compounds achieving an efficiency of the removal of 90% during 5 minutes of contact between the adsorbent and the straight run gas oil, and after 1 h of contact the removal was of 94%. In this way the content of nitrogen compounds was reduce from 536 ppm, that were present in the initial straight run gas oil, to 37 ppm of nitrogen content in the straight run gas oil (SRGO) after the adsorption. The efficiency in the removal of sulfur compounds was from 17 to 20% at the different evaluation times.

Examples 74 to 79

These examples illustrate the effect of the ratio adsorbent mass/volume of straight run gas oil (SRGO) on the capability of removing nitrogen and sulfur compounds contained in a primary light straight run gas oil (SRGO). The ratio mass/volume was varied in the range of 0.02 and 0.2. In Table 11 it is observed that as the ratio mass/volume increases from 0.02 to 0.2 the removal of the nitrogen compounds contained in the light straight run gas oil (SRGO) increases from 36 to 91%, respectively. The removal of sulfur compounds increases from 17 to 28% as the ratio mass/volume is increased.

Examples 80 to 82

These examples illustrate the adsorption of nitrogen and sulfur polar compounds contained in a hydrocarbon fraction called primary light straight run gas oil (SRGO) with the characteristics described in Table 1, load C, at different adsorption temperatures. The adsorbent used is the material prepared in the Example 3. These examples are carried out at a ratio mass/volume of 0.05 and a contact time of 5 min. In Table 12 it is observed that the removal of the sulfur and nitrogen polar compounds form this hydrocarbon fraction is favored at temperatures between 0 and 22° C., while at temperatures higher than 22° C. the capability of removal of such compounds is decreased. The capability of removal of sulfur compounds is constant and of 18%. The optimal temperature for the adsorption of nitrogen compounds was between 22 and 25° C., which is the same optimal temperature found for the diesel, however in the gasoline the capability of adsorption is favored at temperatures lower than the room temperature. Apparently the optimal temperature of adsorption is related with the weight of the load.

The denitrogenation procedure of the present invention allows to lower the content of nitrogen compounds in the primary light straight run gas oil from 536 ppm to a range between 20 to 50 ppm. This primary light straight run gas oil is a hydrocarbon fraction that in general is feed to hydrotreatment plants to obtain a fraction of hydrotreated diesel. With the elimination of the nitrogen compounds from this load it is expected to increase the useful life of the catalysts and improve the performance of the conventional catalysts for hydrotreatment with which it is expected to get combustibles with sulfur content lower than 50 ppm.

Examples 83 to 92

These examples illustrate the removal of nitrogen and sulfur compounds from the heaviest hydrocarbon fraction, which is a feedstock for the fluid catalytic cracking process called load FCC whose properties and characteristics are described in Table 1, load F. The followed experimental procedure was similar to the one described for gasolines, diesel and straight run gas oil, and it was done using the material synthesized in the Example 3. The activation was carried in a similar way as the former examples for gasolines and diesel. Then in a precipitate glass it is deposited 1 g of the adsorbent material which is placed in contact with the FCC load in such a volume that kept the desired ratio mass/volume. Soon after that the mixture is left in contact for 5 min and then filtered in vacuum.

Examples 83 to 86 illustrate the capability of the absorbent material to remove nitrogen compounds from a FCC load at different mass/volume ratios, at a room temperature (25°) and at a contact time of 5 min. The mass/volume ratio was varied between 0.14 and 0.4. In Table 13 it is observed that the efficiency of removal of nitrogen compounds is of 37% for a mass/volume ratio of 0.14. The efficiency of the removal of nitrogen compounds is increased with the mass/volume ratio of 0.4 for which the adsorbent removes 79% of the nitrogen compounds contained in the FCC load. The sulfur compounds contained in the load were not determined and because of this it is not possible to estimate the efficiency of the removal of the sulfur compounds.

Examples 87 to 89 illustrate the capability of the absorbent material to remove nitrogen compounds from a FCC load at different mass/volume ratios and at a temperature of 50° C. The mass/volume ratio was varied between 0.14 and 0.33. In Table 14 it is observed that the efficiency of removal of nitrogen compounds is of 37% for a mass/volume ratio of 0.14. The efficiency of the removal of nitrogen compounds is increased with the mass/volume ratio and at a ratio of 0.33 the absorbent removes 68% of the nitrogen compounds contained in the FCC load.

Examples 90 to 92 illustrate the capability of the absorbent material to remove nitrogen compounds from a FCC load at different mass/volume ratios and at a temperature of 100° C.

The mass/volume ratio was varied between 0.14 and 0.33. In Table 15 it is observed that the efficiency of removal of nitrogen compounds is of 38% for a mass/volume ratio of 0.14. The efficiency of the removal of nitrogen compounds is increased with the mass/volume ratio and at a ratio of 0.33 the absorbent removes 61% of the nitrogen compounds contained in the FCC load.

From these examples it can be concluded that the optimal temperature in which the adsorption of nitrogen compounds contained in a FCC load is favored is 50° C. At a mass/volume ratio of 0.2 the efficiency of removal of nitrogen compounds is of 52, 60, and and 49% at 25, 50, and 100° C., respectively. The optimal temperature of adsorption is related with the weight of the load. For a gasoline with a light weight the optimal temperature is lower than the room temperature (<20° C.), for a diesel and for a primary light straight run gas oil with similar specific weights the optimal temperature is between 20 and 30° C., and for a heavier fraction like the FCC load the optimal temperature in which the adsorption is favored is between 50 and 60° C.

The removal of the nitrogen compounds (inhibitors of the performance of the catalysts) from the feedstock for a fluid catalytic cracking process allows to increase the useful life of the catalysts used in the FCC process, also increases the conversion and the yield of gasoline from such process. Because of this the application of this adsorption process, object of the present invention, to the FCC feedstocks in a refinery for the removal of nitrogen compounds will allow the increase of the economical benefit from such process.

TABLE 1

Physicochemical characteristics and total concentration of the nitrogen and sulfur polar compounds present in the different hydrocarbon fractions used in the examples of the present invention.

| Load | Hydrocarbon Fraction | Characteristics | | N (ppm) | S (ppm) |
|---|---|---|---|---|---|
| A | Gasoline | Specific weight | 0.7507 | 210 | 467 |
| | | Aniline temperature | 69.2 | | |
| | | Octane index | 83 | | |
| | | Initial boiling temperature | 214.8° C. | | |
| | | Final boiling temperature | 376.5° C. | | |
| B | Diesel | Specific weight | 0.8374 | 490 | 578 |
| | | Aniline temperature | 69.2 | | |
| | | Cetane index | 62 | | |
| | | Initial boiling temperature | 171.5° C. | | |
| | | Final boiling temperature | 376.5° C. | | |

TABLE 1-continued

Physicochemical characteristics and total concentration of the nitrogen and sulfur polar compounds present in the different hydrocarbon fractions used in the examples of the present invention.

| Load | Hydrocarbon Fraction | Characteristics | | N (ppm) | S (ppm) |
|---|---|---|---|---|---|
| C | Straight run gas oil (SRGO) | Specific weight | 0.8543 | 536 | 14003 |
| | | Aniline temperature | 69.2 | | |
| | | Cetane index | 56 | | |
| | | Initial boiling temperature | 161.5° C. | | |
| | | Final boiling temperature | 365.5° C. | | |
| D | Light Naphtha from FCC | Specific weight 20/4° C. | 0.7506 | 101 | 1083 |
| | | API gravity | 56.14 | | |
| | | Octane index | 91 | | |
| | | Initial boiling temperature | 40.2° C. | | |
| | | Final boiling temperature | 209.7° C. | | |
| E | Heavy Naphtha from FCC | Specific weight | 0.7742 | 452 | 9924 |
| | | API gravity | 50.5 | | |
| | | Initial boiling temperature | 45.2° C. | | |
| | | Final boiling temperature | 210.6° C. | | |
| F | Load for FCC | Specific weight | 0.9246 | 859 | 18033 |
| | | API gravity | 21.08 | | |
| | | Aniline temperature | 79.0 | | |
| | | Cetane index | 50 | | |
| | | Initial boiling temperature | 268.6° C. | | |
| | | Final boiling temperature | 575.5° C. | | |

TABLE 2

Textural properties and metallic composition of the different materials used as adsorbents, objects of the present invention.

| Example | Metal/content (M/% weight) | Specific Area (m²/g) | Pore Volume (cm³/g) | Average Pore Diameter (nm) |
|---|---|---|---|---|
| 1 | — | 421 | 0.67 | 6.3 |
| 2 | — | 401 | 0.77 | 7.7 |
| 3 | — | 343 | 0.71 | 7.8 |
| 4 | Cu/1.5 | 399 | 0.73 | 7.3 |
| 5 | Cu/4.58 | 391 | 0.70 | 7.3 |
| 6 | Cu/2.41 | 409 | 0.81 | 7.9 |
| 7 | Cu/2.6 | 357 | 0.77 | 8.7 |
| 8 | Cu/2.35 | 389 | 0.73 | 7.5 |
| 9 | Zn/1.9 | 349 | 0.71 | 8.1 |
| 10 | Zn/1.79 | 361 | 0.76 | 8.2 |
| 11 | Anatase Reference | 325 | 0.33 | 4.0 |
| 12 | Anatase Reference | 102 | 0.51 | 20.1 |

TABLE 3

Efficiency of the removal of nitrogen and sulfur polar compounds by the different nanostructured materials synthesized in Examples 1 to 12 with respect to different hydrocarbon fractions.

| Example | Adsorbent Example | Load | Ratio[a] Mass/vol. | N * (ppm) | S * (ppm) | Removal of N % | Removal of S % |
|---|---|---|---|---|---|---|---|
| 13 | 1 | Gasoline A | 0.05 | 21 | 102 | 90 | 78 |
| 14 | 1 | Diesel B | 0.05 | 48 | 179 | 90 | 69 |
| 15 | 1 | Light naphtha D | 0.05 | 9 | 703 | 91 | 35 |
| 16 | 1 | Heavy naphtha E | 0.05 | 43 | 8284 | 90 | 17 |
| 17 | 4 | Diesel B | 0.0125 | 279 | 489 | 43 | 15 |
| 18 | 4 | Diesel B | 0.025 | 118 | 456 | 75 | 21 |
| 19 | 4 | Diesel B | 0.05 | 85 | 403 | 82 | 30 |
| 20 | 5 | Diesel B | 0.05 | 336 | 507 | 30 | 12 |
| 21 | 2 | Diesel | 0.05 | 228 | 502 | 53 | 13 |
| 22 | 2[b] | Diesel | 0.05 | 144 | 443 | 71 | 23 |
| 23 | 6 | Diesel | 0.05 | 137 | 334 | 72 | 42 |
| 24 | 7 | Diesel | 0.05 | 277 | 515 | 43 | 11 |
| 25 | 8 | Diesel | 0.05 | 113 | 468 | 77 | 19 |
| 26 | 9 | Diesel | 0.05 | 78 | 456 | 84 | 21 |
| 27 | 10 | Diesel | 0.05 | 69 | 447 | 86 | 23 |
| 28 | 11 | Diesel | 0.05 | 308 | 534 | 37 | 8 |
| 29 | 12 | Diesel | 0.05 | 299 | 508 | 39 | 12 |

[a]Ratio in grams of adsorbent/volume of the treated hydrocarbon fraction.
[b]Thermically treated at 300° C.
* Final concentration for each example.

TABLE 4

Adsorption of polar compounds contained in a gasoline at different times of contact. The adsorbent material was synthesized in the Example 3. The characteristics of the gasoline load are described in the load A of Table 1.

| Example | Adsorption time (min) | N * (ppm) | S * (ppm) | Removal of N % | Removal of S % |
|---|---|---|---|---|---|
| 30 | 0.5 | 29 | 348 | 93 | 25 |
| 31 | 1 | 40 | 417 | 90 | 11 |
| 32 | 2 | 25 | 345 | 94 | 26 |
| 33 | 3 | 26 | 351 | 93 | 25 |
| 34 | 4 | 25 | 354 | 94 | 24 |
| 35 | 5 | 25 | 355 | 94 | 24 |
| 36 | 7.5 | 25 | 362 | 94 | 22 |
| 37 | 10 | 25 | 364 | 94 | 22 |

Ratio mass of adsorbent/volume of treated gasoline = 0.2.
Temperature of adsorption = 22° C.
* Final concentration in each example.

TABLE 5

Adsorption of polar compounds contained in a gasoline at different ratios adsorbent mass/gasoline volume. The adsorbent material was synthesized in the Example 3. The characteristics of the gasoline load are described in the load A of Table 1.

| Example | Ratio Mass/vol (g of adsorbent/ ml of gasoline) | N * (ppm) | S * (ppm) | Removal of N % | Removal of S % |
|---|---|---|---|---|---|
| 38 | 0.02 | 151 | 395 | 61 | 15 |
| 39 | 0.025 | 129 | 393 | 67 | 16 |
| 40 | 0.033 | 120 | 385 | 69 | 18 |
| 41 | 0.05 | 88 | 379 | 77 | 19 |
| 42 | 0.1 | 49 | 358 | 87 | 23 |
| 43 | 0.2 | 29 | 327 | 93 | 30 |

Temperature of adsorption = 22° C.
Time of adsorption = 5 min.
* Final concentration in each example.

TABLE 6

Adsorption of polar compounds contained in a gasoline at different temperatures of adsorption. The adsorbent material was synthesized in the Example 3. The characteristics of the gasoline load are described in the load A of Table 1.

| Example | Adsorption Temperature (° C.) | N * (ppm) | S * (ppm) | Removal of N % | Removal of S % |
|---|---|---|---|---|---|
| 44 | 5 | 81 | 384 | 79 | 18 |
| 45 | 22 | 88 | 379 | 77 | 19 |
| 46 | 40 | 104 | 403 | 73 | 14 |

Ratio mass of adsorbent/volume of treated gasoline = 0.05
Time of adsorption = 5 min.
* Final concentration in each example.

TABLE 7

Adsorption of polar compounds contained in diesel at different times of contact. The adsorbent material was synthesized in the Example 3. The characteristics of the diesel load are described in the load B of Table 1.

| Example | Adsorption time (min) | N * (ppm) | S * (ppm) | Removal of N % | Removal of S % |
|---|---|---|---|---|---|
| 47 | 0.5 | 122 | 526 | 75 | 9 |
| 48 | 1 | 119 | 520 | 76 | 10 |
| 49 | 2 | 118 | 511 | 76 | 12 |
| 50 | 3 | 118 | 510 | 76 | 12 |
| 51 | 4 | 117 | 504 | 76 | 13 |
| 52 | 5 | 118 | 503 | 76 | 13 |
| 53 | 7.5 | 117 | 499 | 76 | 14 |
| 54 | 10 | 118 | 490 | 76 | 15 |

Ratio mass of adsorbent/volume of treated diesel = 0.05
Temperature of adsorption = 22° C.
* Final concentration in each example.

TABLE 8

Adsorption of polar compounds contained in a diesel at different ratios adsorbent mass/volume of diesel. The adsorbent material was synthesized in the Example 3. The characteristics of the diesel load are described in the load B of Table 1.

| Example | Ratio Mass/vol (g of adsorbent/ ml of diesel) | N* (ppm) | S* (ppm) | Removal of N % | Removal of S % |
|---|---|---|---|---|---|
| 55 | 0.02 | 210 | 464 | 57 | 20 |
| 56 | 0.025 | 179 | 449 | 63 | 22 |
| 57 | 0.033 | 143 | 453 | 71 | 22 |
| 58 | 0.05 | 109 | 446 | 78 | 23 |
| 59 | 0.1 | 63 | 428 | 87 | 26 |
| 60 | 0.2 | 42 | 420 | 91 | 27 |

Temperature of adsorption = 22° C.
Time of adsorption = 5 min.
* Final concentration in each example.

TABLE 9

Adsorption of polar compounds contained in diesel at different temperatures of adsorption. The adsorbent material was synthesized in the Example 3. The characteristics of the diesel load are described in the load B of Table 1.

| Example | Adsorption Temperature (° C.) | N* (ppm) | S* (ppm) | Removal of N % | Removal of S % |
|---|---|---|---|---|---|
| 61 | 10 | 153 | 445 | 69 | 23 |
| 62 | 22 | 109 | 446 | 78 | 23 |
| 63 | 40 | 163 | 458 | 67 | 21 |

Ratio mass of adsorbent/volume of treated diesel = 0.05
Time of adsorption = 5 min.
* Final concentration in each example.

TABLE 10

Adsorption of polar compounds contained in a primary light run gas oil (SRGO) (feedstock for hydrotreatment) at different times of contact. The adsorbent material was synthesized in the Example 3. The characteristics of the straight run gas oil (SRGO) load are described in the load C of Table 1.

| Example | Adsorption time (min) | N* (ppm) | S* (ppm) | Removal of N % | Removal of S % |
|---|---|---|---|---|---|
| 64 | 0.5 | 192 | 11239 | 64 | 21 |
| 65 | 1 | 184 | — | 66 | — |
| 66 | 3 | 78 | — | 85 | — |
| 67 | 5 | 60 | 11145 | 89 | 20 |
| 68 | 10 | 70 | 11041 | 87 | 21 |
| 69 | 15 | 51 | — | 90 | — |
| 70 | 20 | 47 | — | 91 | — |
| 71 | 30 | 47 | — | 91 | — |
| 72 | 45 | 48 | — | 91 | — |
| 73 | 60 | 37 | 11004 | 93 | 21 |

Ratio mass of adsorbent/volume of SRGO = 0.05
Temperature of adsorption = 25° C.
* Final concentration in each example.

TABLE 11

Adsorption of polar compounds contained in a primary light straight run gas oil (SRGO) (feedstock for hydrotreatment) at different ratios of adsorbent mass/volume of straight run gas oil (SRGO). The adsorbent material was synthesized in the Example 3. The characteristics of the straight run gas oil (SRGO) load are described in the load C of Table 1.

| Example | Ratio Mass/vol (g of adsorbent/ ml of SRGO) | N* (ppm) | S* (ppm) | Removal of N % | Removal of S % |
|---|---|---|---|---|---|
| 74 | 0.02 | 343 | 11632 | 36 | 17 |
| 75 | 0.025 | 305 | 11595 | 43 | 17 |
| 76 | 0.033 | 220 | 11588 | 60 | 17 |
| 77 | 0.05 | 143 | 11445 | 73 | 18 |
| 78 | 0.1 | 82 | 10917 | 85 | 22 |
| 79 | 0.2 | 47 | 9954 | 91 | 28 |

Temperature of adsorption = 22° C.
Time of adsorption = 5 min.
* Final concentration in each example.

TABLE 12

Adsorption of polar compounds contained in a primary light straight run gas oil (SRGO) (feedstock for hydrotreatment process) at different temperatures of adsorption. The adsorbent material was synthesized in the Example 3. The characteristics of the straight run gas oil (SRGO) load are described in the load C of Table 1.

| Example | Adsorption Temperature (° C.) | N* (ppm) | S* (ppm) | Removal of N % | Removal of S % |
|---|---|---|---|---|---|
| 80 | 0 | 150 | — | 72 | — |
| 81 | 22 | 143 | 11445 | 73 | 18 |
| 82 | 55 | 170 | — | 68 | — |

Ratio mass of adsorbent/volume of treated SRGO = 0.05
Time of adsorption = 5 min.
* Final concentration in each example.

TABLE 13

Adsorption of polar compounds contained in a heavy hydrocarbon fraction called FCC load (feedstock for fluid catalytic cracking process) at different ratios of adsorbent mass/FCC load volume at room temperature of 25° C. The adsorbent material was synthesized in the Example 3. The characteristics of the FCC load are described in the load F of Table 1.

| Example | Ratio Mass/vol (g of adsorbent/ ml of FCC load) | N* (ppm) | S* (ppm) | Removal of N % | Removal of S % |
|---|---|---|---|---|---|
| 83 | 0.143 | 531 | — | 38 | — |
| 84 | 0.200 | 409 | — | 52 | — |
| 85 | 0.333 | 308 | — | 64 | — |
| 86 | 0.400 | 180 | — | 79 | — |

Temperature of adsorption = 25° C.
Time of adsorption = 5 min.
* Final concentration in each example.

TABLE 14

Adsorption of polar compounds contained in a heavy hydrocarbon fraction called FCC load (feedstock for fluid catalytic cracking process) at different ratios of adsorbent mass/FCC load volume at room temperature of 50° C.

| Example | Ratio Mass/vol (g of adsorbent/ ml of FCC load) | N* (ppm) | S* (ppm) | Removal of N % | Removal of S % |
|---|---|---|---|---|---|
| 87 | 0.143 | 516 | — | 40 | — |
| 88 | 0.200 | 338 | — | 60 | — |
| 89 | 0.333 | 271 | — | 68 | — |

Temperature of adsorption = 25° C.
Time of adsorption = 5 min.
* Final concentration in each example.

TABLE 15

Adsorption of polar compounds contained in a heavy hydrocarbon fraction called FCC load (feedstock for fluid catalytic cracking process) at different ratios of adsorbent mass/FCC load volume at room temperature of 100° C.

| Example | Ratio Mass/vol (g of adsorbent/ ml of FCC load) | N* (ppm) | S* (ppm) | Removal of N % | Removal of S % |
|---|---|---|---|---|---|
| 90 | 0.143 | 531 | — | 38 | — |
| 91 | 0.200 | 439 | — | 49 | — |
| 92 | 0.333 | 333 | — | 61 | — |

Temperature of adsorption = 25° C.
Time of adsorption = 5 min.
* Final concentration in each example.

What is claimed is:

1. A process for the selective adsorption of nitrogen compounds and/or sulfur compounds from a hydrocarbon fraction, which comprises contacting said hydrocarbon fraction with an adsorbent comprising a nanostructured JT phase titanium oxide material of the formula $TiO_{2-x}$, where $0 \leq x \leq 1$, having an orthorhombic crystalline structure which is thermically stable and with a nanofibrilar and/or nanotubular morphology, constituted by piled structural layers, which are folded or rolled inwards into themselves, or formed from overlapped semitubes.

2. The process of claim 1, wherein said nanostructured titanium oxide material has a unit cell with orthorhombic symmetry, which is described by at least one of the space groups 59 Pmmn, 63 Amma, 71 Immm, or 63 Bmmb.

3. The process of claim 1, wherein said adsorbent additionally comprises a transition metal oxide promoter.

4. The process of claim 3, wherein said promoter is a Group IB, IIB, VI, VII or VIIIA metal oxide.

5. The process of claim 4, wherein said promoter is an oxide of cobalt or zinc.

6. The process of claim 1, wherein said hydrocarbon fraction is gasoline, diesel, primary straight run gas oil, FCC light naphtha or a FCC heavy naphtha.

7. The process of claim 6, wherein said process is conducted at a temperature between 0 and 150°C. a pressure between 0.5 and 3.0 atm, an adsorbent/volume ratio of the hydrocarbon fraction to be treated between 0.01 and 0.5, and an adsorption time between 0.5 and 60 min.

8. The process of claim 6, wherein a gasoline fraction is treated said process is conducted at a pressure between 0.5 to 3 atm, a ratio of adsorbent mass/volume of treated hydrocarbon between 0.0125 and 0.2, an adsorption temperature between 10 and 40° C., an adsorption time between 0.5 and 60 min, resulting in a percentage of nitrogen removal of 30 to 95%, and a percentage of sulfur removal of 5 to 72%.

9. The process of claim 6, wherein a diesel fraction is treated at a pressure between 0.5 to 3 atm, a ratio adsorbent mass/volume of treated hydrocarbon between 0.0125 and 0.2, adsorption temperature between 10 and 40° C., adsorption time between 0.5 and 60 min, resulting in a percentage of nitrogen removal of 30 to 95%, and percentage of sulfur removal of 5 to 72%.

10. The process of claim 6, wherein a primary light straight run gas oil (SRGO) fraction is treated at a pressure between 0.5 to 3 atm, a ratio adsorbent mass/volume of treated hydrocarbon between 0.02 and 0.2, adsorption temperature between 5 and 60° C., adsorption time between 0.5 and 60 min, resulting in a percentage of nitrogen removal of 30 to 95%, and a percentage of sulfur removal of 15 to 30%.

11. The process of claim 6, wherein a FCC light naphtha fraction is treated at a pressure between 0.5 to 3 atm, a ratio adsorbent mass/volume of treated hydrocarbon between 0.02 and 0.06, adsorption temperature between 20 and 30° C., adsorption time between 0.5 and 60 min, resulting in a percentage of nitrogen removal of 85 to 95%, and a percentage of sulfur removal of 25 to 40%.

12. The process of claim 6, wherein a FCC heavy naphtha fraction is treated at a pressure between 0.5 to 3 atm, a ratio adsorbent mass/volume of treated hydrocarbon between 0.02 and 0.06, adsorption temperature between 20 and 45° C., adsorption time between 0.5 and 60 min, resulting in a percentage of nitrogen removal of 85 to 95%, and percentage of sulfur removal of 15 to 20%.

13. The process of claim 6, wherein a FCC load is treated at a pressure between 0.5 to 3 atm, a ratio adsorbent mass/volume of treated hydrocarbon between 0.013 and 0.5, adsorption temperature between 20 and 100° C., adsorption time between 4 and 30 min, resulting in a percentage of nitrogen removal of 35 to 85%.

14. The process of claim 4, wherein said adsorbent comprises between 1 and 20 weight percent of said promoter based on the total weight of said adsorbent.

15. The process of claim 2, wherein said nanostructured titanium oxide material has a unit cell with orthorhombic symmetry, which is described by the space group 59 Pmmn.

16. The process of claim 2, wherein said nanostructured titanium oxide material has a unit cell with orthorhombic symmetry, which is described by the space group 63 Amma.

17. The process of claim 2, wherein said nanostructured titanium oxide material has a unit cell with orthorhombic symmetry, which is described by the space group 71 Immm.

18. The process of claim 2, wherein said nanostructured titanium oxide material has a unit cell with orthorhombic symmetry, which is described by the space group 63 Bmmb.

19. The process of claim 2, wherein said adsorbent comprises between 1 and 20 weight percent of said promoter based on the total weight of said adsorbent composition.

20. The process of claim 19, wherein said promoter is a Group IB, IIB, VI, VII or VIIIA metal oxide.

21. The process of claim 20, wherein said promoter is an oxide of Zn, Cu, Ni, Co, Fe, Ag, Mn, Cr, V, Mo, W, Co or Zn.

22. The process of claim 21, wherein said promoter is an oxide of Co or Zn.

23. The process of claim 19, wherein said composition is formed by a process including subjecting a hydrogen titanate and/or mixed sodium and hydrogen to ionic exchange with a Cu or a Zn oxide.

24. The process of claim 3, wherein in which the nanostructured titanium oxide material comprises between 99 weight percent and 80 weight percent of the total weight of said adsorbent.

25. The process of claim 1, wherein the nanostructured titanium oxide presents an specific superficial area in the range of 50 and 500 m2/g, and a pore distribution between 2 and 10 nm.

26. The process of claim 1, wherein the nanostructured titanium oxide material has an orthorhombic structure with a unit cell described by the spatial group 59 Pmmn, an X-ray peak about 10 degrees in the 2θ scale (plane 200), and a number of structural layers between 1 and 50.

27. The process of claim 1, wherein the nanostructured titanium oxide presents oxygen vacancies represented by the formula: $TiO_{2-x}$ (where x=0 to 1).

28. The process of claim 1, wherein said adsorbent comprising the nanostructured titanium oxide is in the form of particles, powders, tablets, extrudates, spheres or microspheres.

* * * * *